United States Patent [19]
Cheng et al.

[11] Patent Number: 5,768,005
[45] Date of Patent: *Jun. 16, 1998

[54] MULTI-STAGE OPTICAL ISOLATOR

[75] Inventors: Yihao Cheng, Kanata; Gary S. Duck, Nepean, both of Canada

[73] Assignee: JDS Fitel Inc., Nepean, Canada

[*] Notice: The term of this patent shall not extend beyond the expiration date of Pat. No. 5,471,340.

[21] Appl. No.: 533,837

[22] Filed: Sep. 28, 1995

Related U.S. Application Data

[63] Continuation-in-part of Ser. No. 178,838, Jan. 7, 1994, Pat. No. 5,471,340.
[51] Int. Cl.⁶ .................. G02B 5/30; G02B 27/28; G02F 1/09; G02F 1/095
[52] U.S. Cl. .............. 359/281; 359/484; 359/495; 359/497; 385/11; 385/18
[58] Field of Search ............... 359/281, 282, 359/484, 495, 497; 372/703; 385/11, 18

[56] References Cited

U.S. PATENT DOCUMENTS

| | | | |
|---|---|---|---|
| 4,554,449 | 11/1985 | Taniuchi et al. | 385/11 |
| 4,963,003 | 10/1990 | Hiiro | 359/495 |
| 4,974,944 | 12/1990 | Chang | 359/484 |
| 5,033,830 | 7/1991 | Jameson | 350/403 |
| 5,089,786 | 2/1992 | Tamura | 359/484 |
| 5,191,467 | 3/1993 | Kapany et al. | 385/11 |
| 5,204,771 | 4/1993 | Koga | 359/281 |
| 5,299,056 | 3/1994 | Kurata et al. | 359/629 |
| 5,471,340 | 11/1995 | Cheng et al. | 359/495 |
| 5,574,596 | 11/1996 | Cheng | 359/484 |

FOREIGN PATENT DOCUMENTS

| | | | |
|---|---|---|---|
| 0218623 | 11/1985 | Japan | 359/484 |
| 0169423 | 7/1989 | Japan | 359/484 |
| 0175069 | 6/1994 | Japan | 359/484 |

*Primary Examiner*—Ricky D. Shafer
*Attorney, Agent, or Firm*—Neil Teitelbaum & Associates

[57] ABSTRACT

This invention relates to a reflective optical isolating device having at least two stages. In one embodiment a polarization independent optical isolating device has an input/output end and a reflector at another end. An isolator is disposed between the reflector and the input/output end. The isolator includes a non-reciprocal rotator in the form of a Faraday rotator, and in one embodiment the isolator also includes two reciprocal rotators. A first end of the isolator includes a birefringent crystal for separating an input beam of light in an input direction and for combing two beams of light in an output direction. The isolator also includes a second birefringent crystal at the other end for combining a separated beam of light on route to the reflector and for separating a combined beam of light in the output direction. In one embodiment two separate single isolation stages are provided, and in another embodiment two stage isolation is provided without providing two single stages of isolation.

9 Claims, 6 Drawing Sheets

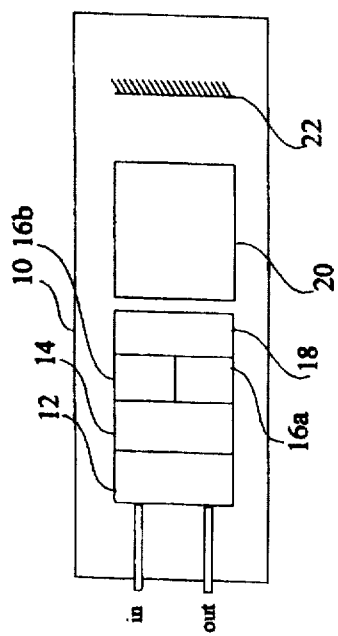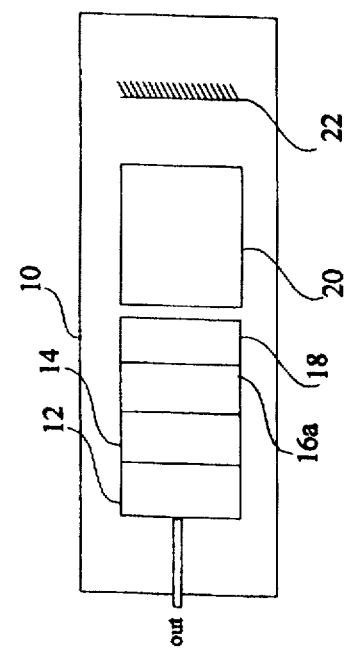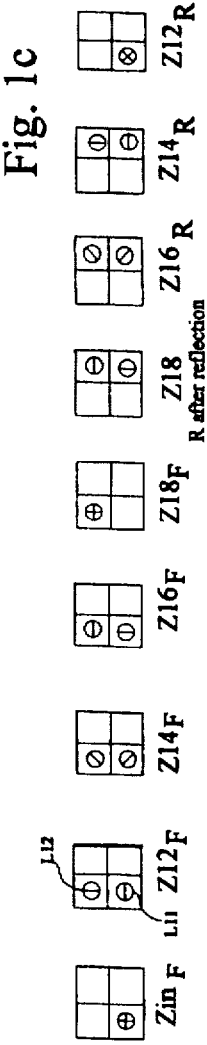

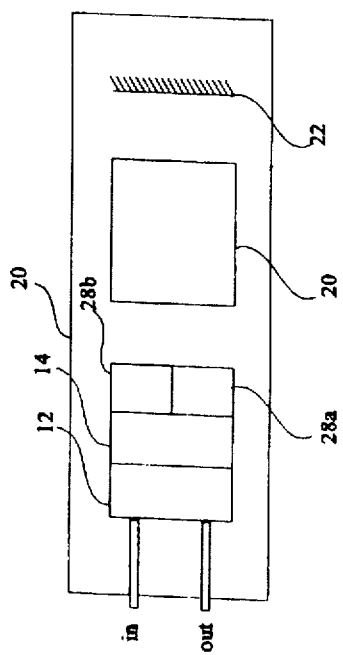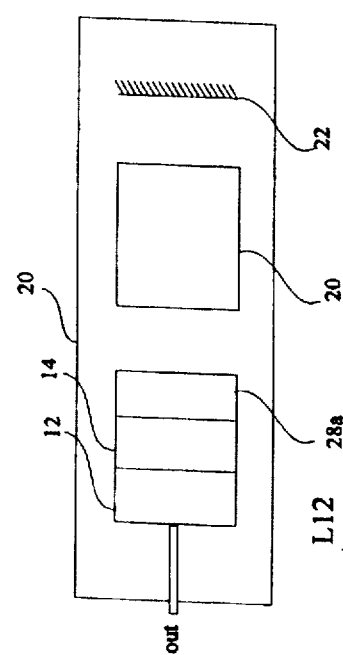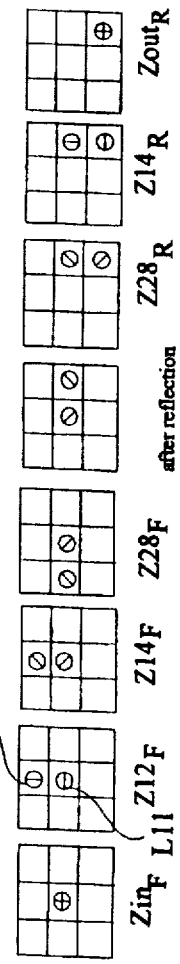
Fig. 2a
Fig. 2b
Fig. 2c

MULTI-STAGE OPTICAL ISOLATOR

This is a continuation-in-part application of Ser. No. 178,838 filed, Jan. 7, 1994 now U.S. Pat. No. 5,471,340.

FIELD OF THE INVENTION

This invention relates generally to a multi-stage optical isolator and more particularly to a reflective optical isolating device having at least two stages.

BACKGROUND OF THE INVENTION

Optical isolators are used in a variety of applications in optical communication systems. Generally, optical isolators are used to prevent reflective portions of transmitted signals from re-entering the transmitting device. Many older prior art designs prevent reflections from re-entering a transmitting device in a polarization-selective manner. However, in certain circumstances where a transmission system causes uncontrollable changes in polarization, the polarization state of a signal may be unknown, and thus, these earlier polarization dependent designs are not considered to be practical. Thus, as of late, a large effort has been undertaken to develop an isolator that is polarization independent.

One prior art polarization independent optical isolator is described in U.S. Pat. No. 5,033,830 issued Jul. 23, 1991 in the name of Jameson and entitled Polarization Independent Optical Isolator. Jameson describes an isolator having a single birefringent plate, a pair of stacked reciprocal rotators, a Faraday rotator, and a reflector positioned in tandem adjacent to the birefringent plate. In a forward (transmitting) direction, a lightwave signal exiting an optical fiber is split into a pair of orthogonal rays by the birefringent plate. The orthogonal rays then pass through a first reciprocal rotator and the Faraday rotator which provides 22.5° of rotation. The rotated rays are then redirected by the reflector back though the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber. In practice, Jameson's single stage isolator described above, may provide adequate isolation; however, in some instances, increased isolation may be required. Such additional isolation has been known to be provided by using a multi-stage optical isolating device, however known prior art multi-stage devices tend to be bulky and costly to manufacture, often requiring nearly double the number of optical components that a single stage device requires.

As with most electronic and optical devices today, there is an increasing focus on miniaturizing and as well on reducing the cost of manufacturing devices. At times, these objectives are mutually compatible, such that when a device is miniaturized, its cost of manufacture decreases.

With this in mind, and in view of the known disadvantages and limitations of prior art devices, it is an object of this invention to provide a reflective two-stage optical isolator.

It is a further object of the invention to provide an embodiment that is a two-stage optical isolator that is polarization independent.

SUMMARY OF THE INVENTION

In accordance with the invention, there is provided, a multi-stage optical isolating device comprising an input/output end; at least a partial reflector at another end of the device, an isolating means disposed between the input/output end and the other end; a lens means disposed between the input end and the other end for directing light to the at least partial reflector and for directing light from the at least partial reflector back to the input/output end, the isolating means including a first and second means for providing polarized light from a beam of light, said first and second means having a non-reciprocal rotating means disposed therebetween.

In accordance with the invention there is further provided, a multi-stage polarization independent optical isolating device comprising:

an input/output end;

at least a partial reflecting surface at another end of the device;

first isolating means disposed between the input/output end and the other end;

a lens means disposed between the input/output end and the other end for directing light from the isolating means to the at least partial reflector and for directing the beam of light from the at least partial reflector to the first isolating means, the first isolating means including first and second birefringent crystals for separating and combining light; and, a non-reciprocal rotating means disposed between the first and second birefringent crystals.

In accordance with the invention there is further provided a multi-stage optical isolating device comprising:

an input/output port end;

an other end;

an at least partially reflecting surface at the other end;

an isolating device disposed between the input/output end and the at least partially reflecting surface, the isolating device for providing a first stage of isolation in a first direction from the input/output end to the reflecting surface, and for providing a second stage of isolation in a second opposite direction from the reflecting surface to the input/output end, the isolating device including at least a non-reciprocal rotating element.

BRIEF DESCRIPTION OF THE DRAWINGS

Exemplary embodiments of the invention will now be described in conjunction with the accompanying drawings in which:

FIG. 1a is a plan view of an embodiment of a polarization independent two-stage reflective optical isolator in accordance with the present invention;

FIG. 1b is a side view of the embodiment shown in FIG. 1a;

FIG. 1c is a state diagram depicting the state of light entering and leaving optical elements of the isolator of FIG. 1a.

FIG. 2a is a plan view an alternative embodiment of a polarization independent reflective optical isolator in accordance with the invention;

FIG. 2b is a side view of the embodiment shown in FIG. 2a;

FIG. 2c is a state diagram depicting the state of light entering and leaving optical elements of the isolator of FIG. 2a;

DETAILED DESCRIPTION

Figure 3:
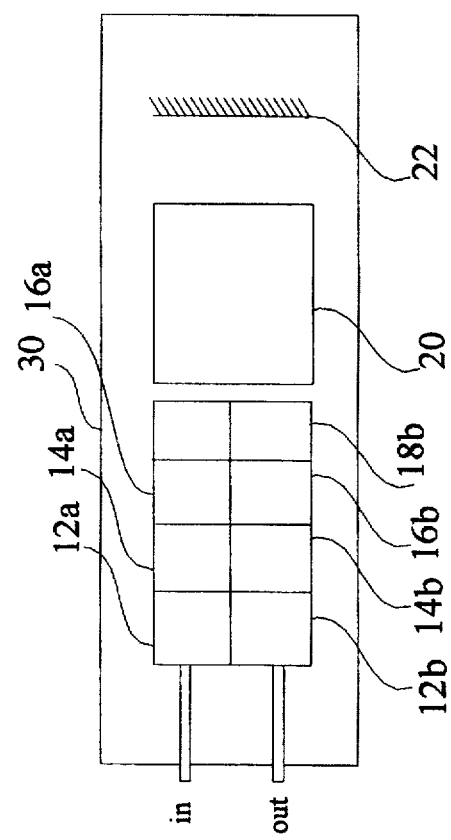
FIG. 3 is a plan view of an alternative embodiment of a polarization independent two-stage reflective optical isolator in accordance with the present invention.

Referring now to FIGS. 1a and 1b, a first embodiment of a two-stage polarization independent optical isolator is shown. The device 10 has an input/output end having an input optical fiber labeled "in" and an output optical fiber labeled "out" serving as ports for transmitting and receiving optical signals, respectively. Both of these ports are coupled to a means for providing polarized light from a beam of light in the form of a birefringent crystal 12. In a transmitting non-reflecting direction (shown a left-to-right) the crystal 12 separates an incoming beam of light into two polarization states, physically separating the beam into two beams having two polarized light components L11 and L12. A Faraday (non-reciprocal) rotator 14 is adjacent to the crystal 12 for rotating the two polarized separated beams 45°. A first quarter-waveplate 16a (+22.5°) and a second quarter-waveplate 16b (−22.5°) are disposed next to the Faraday rotator 14. A second birefringent crystal 18 is disposed adjacent the waveplates 16a and 16b for combing the two beams of light in the transmitting non-reflecting direction. A lens 20 directs the combined beam of light (in the transmitting direction) from the birefringent crystal 18, to a reflector 22 at an opposite end of the device from the input/output port. Thus a non-reflection transmission path is defined from the input/output port through elements 12, 14, 16a and 16b, 18, and 20 to the reflecting surface 22. In the reflecting direction (as shown from right-to-left), a single beam of light at the reflecting surface 22 is directed to the birefringent crystal 18 via the lens 20. The returning reflecting signal is, in this direction, separated by the crystal 18 into two beams having two orthogonal polarization states; the beams pass through the non-reciprocal and reciprocal rotators 16a, 16b and 14 respectively. In this returning direction the beam is combined by the crystal 12 and is shifted to the optical fiber labeled "out". In an alternative embodiment (not shown), the order of the reciprocal and non-reciprocal rotators may be reversed.

Calcite or rutile crystals are preferably used for the above refraction crystal plates 12 and 18. The non-reciprocal rotator is preferably a Faraday rotating element 14 that uses a Y.I.G crystal or Bi-added thin film crystal. The composition of the Bi-added thin film crystals include a combination of, for example, $(YbTbBi)_3Fe_5O_{12}$ and $(GdBi)_3(GeAlGa)_5O_{12}$, or of Y.I.G. and $Y_{3-x}Bi_xFe_5O_{12}$.

Next, in conjunction with FIG. 1c, the detailed operation of the device will now be described. Light entering the optical fiber labeled "in" is followed and explained as it enters and exits each optical element on its forward (shown as left-to-right and labeled F) and reverse (shown as right-to-left and labeled R) paths through the device 10 beginning at the fiber labeled "in" and ending at the optical fiber labeled "out". States $Zin_F$, $Z12_F$, $Z14_F$, $Z16_F$ and $Z18$ are indicated in FIG. 1c and coincide with elements 12, through 18. Sub indices $_F$ and $_R$ are used to indicate the forward and reverse directions after light passes through a particular optical element shown in FIG. 1a. Light injected from the light incoming port or optical fiber labeled "in" is in a state Zin and is separated into light L11 and light L12 by the first refraction crystal plate 12 and is in a state $Z12_F$. The electric field vibration of light L11 and light L12 which are perpendicular to each other, proceed in the same direction as a result of the light L11 and L12 passing through the non-reciprocal Faraday rotator 14. The state of the polarization after passing through 14 is shown by $Z14_F$; L11 and L12 having been rotated 45 degrees by 14. L11 and L12 at $Z16_F$ are shown oriented vertically and horizontally respectively having been rotated by the reciprocal rotator 16a. Next the birefringent crystal 18 in the forward direction indicated by state $18_F$ combines and shifts the beams shown by state $Z18_F$. The combined beam then propagates through the lens 20 and is directed to the mirror 22. After the first stage is completed, the beam is then reflected backward and a second stage of isolation follows beginning with state $Z18_R$. The beam is separated by the crystal 18 into two orthogonal light rays. The rotators 16 then each rotate one of the two rays as is shown in state $Z16_R$. Further 45° rotation occurs in state $Z14_R$; and, the optical birefringent crystal 12 that was used for separating the beam in the forward direction is used to combine the beam in this reverse direction shown by state $Z12_R$. By using a folded (reflective) configuration the number of elements required in the manufacture of the device are substantially reduced and thus, the cost of making the device is significantly reduced.

Referring now to FIGS. 2a and 2b, an alternative embodiment of the invention is shown having fewer components than the first embodiment; in contrast to the previously described embodiment of FIG. 1, the device 20 is not comprised of two single stage isolation stages, but is a two stage polarization independent isolating device. The device 20 has a first birefringent crystal 12, a Faraday rotator 14 adjacent the crystal 12, and two birefringent crystals 28a and 28b adjacent the Faraday rotator 14. The input end of the device 20 includes an input and output optical fiber and is essentially the same as the input/output end of the device of FIG. 1. However, the device 20 is absent reciprocal waveplates. A lens 20 is disposed next to the crystals 28a and 28b for directing a ray of light toward a mirror 22 in the forward direction. In this embodiment the mirror is preferably totally reflective. The thickness of each of the birefringent crystals 28a and 28b is √2 times the thickness of the first birefringent crystal 12.

The operation of the device 20 will now be explained in conjunction with FIG. 2c. Light injected from the light incoming port or optical fiber labeled "in" is in a state Zin and is separated into light L11 and light L12 by the first refraction crystal plate 12 and is in a state $Z12_F$. The electric field vibration of light L11 and light L12 which are perpendicular to each other, proceed in the same direction as a result of the light L11 and L12 passing through the non-reciprocal Faraday rotating waveplate 14. The state of the polarization after passing through 14 is shown by $Z14_F$; L11 and L12 having been rotated 45 degrees by 14. State $Z28_F$ shows the light L11 as unchanged from the previous state and L12 is shifted to the left. After the two light rays L11 and L12 are reflected off the mirror 22, light ray L11 remains unchanged and light ray L12 becomes reflected on the opposite side of the optical axis. Light ray L11 is then shifted by the birefringent crystal 28b as is shown in State 28$_R$. Both of the light rays L11 and L12 are then rotated by the Faraday rotator 14 in state Z14$_R$. Then, the light rays are combined into a single beam as state $Z_{out}$ indicates. Thus, two stage isolation is achieved from state Zin$_F$ to Zout$_R$.

Turning now to FIG. 3 a third embodiment of the invention is shown similar in many respects to the first embodiment. In FIG. 3 the device 30 has an input/output end having an input optical fiber labeled "in" and an output optical fiber labeled "out" serving as ports for transmitting and receiving optical signals, respectively. The input optical fiber "in" is coupled to a birefringent crystal 12a that in a transmitting non-reflecting direction (shown a left-to-right) separates an incoming beam of light into two polarization states, physically separating the beam into two beams having two light components. A Faraday (non-reciprocal) rotator 14a is adjacent to the crystal 12a for rotating the two polarized separated beams 45°. A first quarter-waveplate 16a (+22.5°) is disposed next to the Faraday rotator 14a. A birefringent crystal 18a is disposed adjacent the waveplate 16a for combing the two beams of light in the transmitting non-reflecting direction. A lens 20 directs the combined beam of light (in the transmitting direction) from the birefringent crystal 18a, to a reflector 22 at an opposite end of the device from the input port. Thus a non-reflection transmission path is defined from the input/output port through elements 12a, 14a, 16a 18a, and 20 to the reflecting surface 22 that defines a first polarization independent stage. In the reverse direction similar elements (labeled from right to left) 18b, 16b (−22.5°), 14b, and 12b are provided. The crystal 12b serves to combine the rays of light and provide the combined light to an output optical fiber labeled "out". Thus, elements 12a, 14a, 16a and 18a provide an isolating light path in a forward direction and optical elements 12b, 14b, 16b and 18b provide an isolating light path in a reverse direction after the forward propagating light rays are reflected backward having been reflected from a mirror 22.

In the embodiments shown heretofore, alternative arrangements are described and shown for multi-stage polarization independent optical isolation. The embodiments that follow offer similar isolation as well as the ability to tap light from, or couple light into the isolating device.

Figure 4:
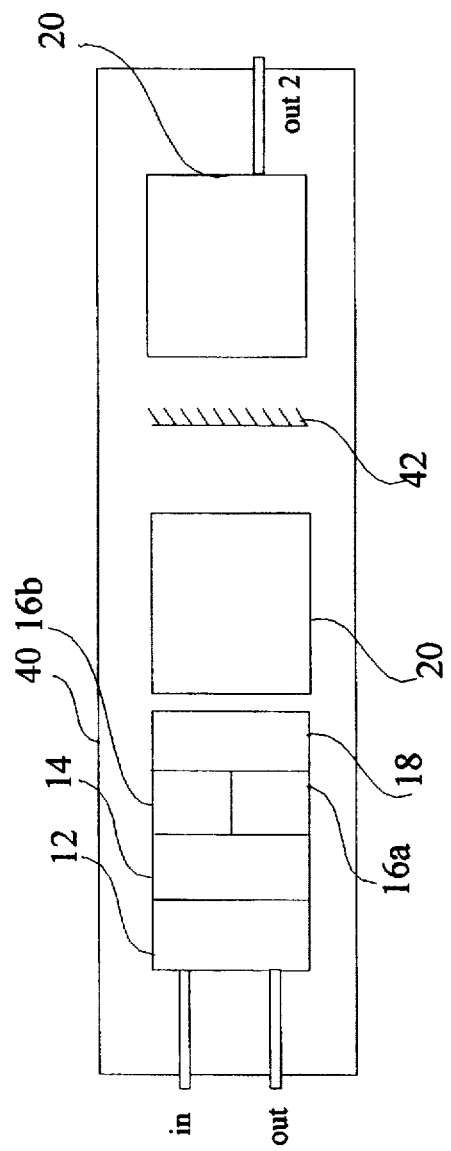
FIG. 4 is a plan view of an alternative embodiment of a polarization independent two-stage reflective optical isolator having a monitoring port for tapping out a small percentage of input light.

Referring now to FIG. 4, an embodiment is shown wherein the device 40, similar in most respects to the device 10, includes a reflecting surface 42 that is partially reflecting and partially transmitting. By providing such an arrangement, a portion of any input light that travels through the first stage of the isolator is transmitted through the partially reflecting surface 42 and is guided by a lens 40 and focused to an output fiber labeled "out 2". Hence, this embodiment provides an isolator that includes a tapping or monitoring port, (out 2) for allowing a controlled amount of light to be tapped out and monitored. Of course, the proportion of light tapped is dependent on the selected ratio of the reflectivity/transmissivity of the reflecting surface 42. Alternatively, the lens 40 and the port "out 2" can be replaced by an optical detector (not shown).

Figure 5:
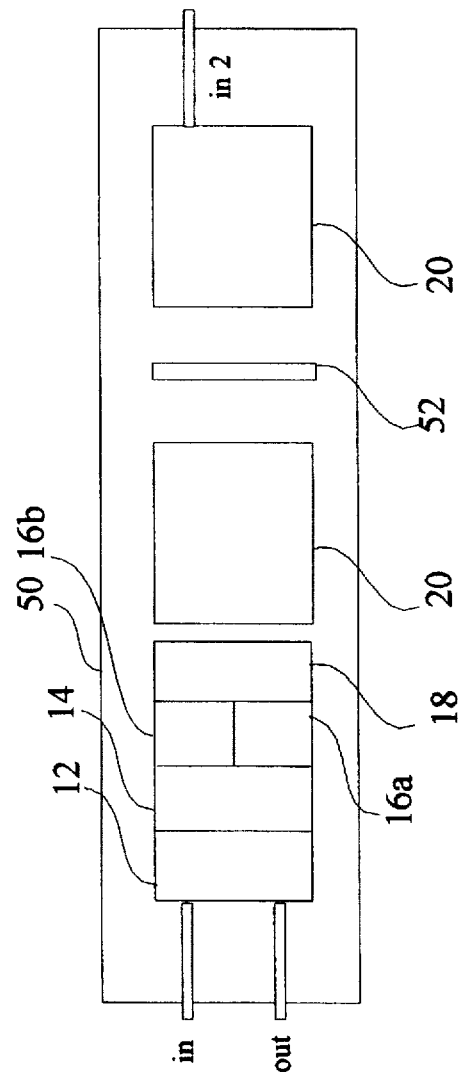
FIG. 5 is a plan view of an alternative embodiment of a polarization independent two-stage reflective optical isolator having a WDM filter for allowing some light of a predetermined wavelength to be coupled into the isolator.

FIG. 5 shows yet another embodiment of the invention wherein the reflecting surface 20 of FIG. 1 is replaced with a wavelength dependent multiplexing/demultiplexing (WDM) filter 52. The WDM filter 52 is designed to allow light of a predetermined wavelength λ2 to pass therethrough, and is designed to reflect light of a predetermined wavelength λ1. Therefore, light of a wavelength λ1 entering the device 50 travels through elements 12, 14, 16a, 16b, 18, and 20 and is then reflected from the WDM back for a second stage of isolation. Light of a wavelength λ2, entering an other input port labeled 'in 2" passed through the WDM filter and is coupled into the device. Therefore light of wavelength λ1 launched into the optical fiber labeled "in" and light of wavelength λ2 launched into the optical fiber "in 2" travels to the output port "out". Other variations may be envisaged; for example, light of wavelength λ1 and λ2 can be launched into the input optical fiber labeled "in", wherein the light of wavelength λ1 propagates through the two stage isolator to the output optical fiber labeled "out". The light of wavelength λ2 however, is directed out through the WDM filter to the optical fiber labeled "in 2", thereby providing an isolator for a first channel, light having a wavelength λ1 and providing a means of tapping out a second channel, light of wavelength λ2.

Of course, the features described in FIGS. 4 and 5 are compatible with the embodiments of FIGS. 2, or 3.

Figure 6:
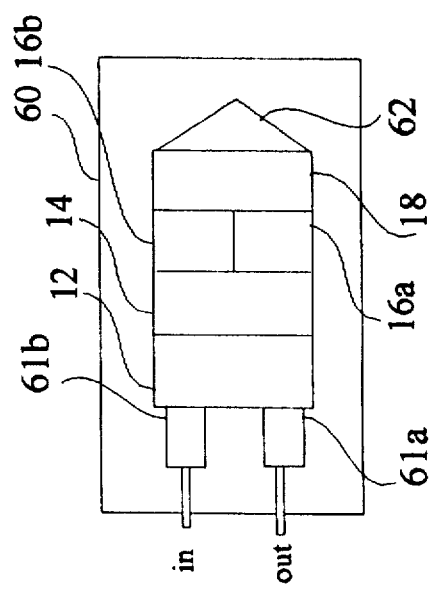
FIG. 6 is a plan view of an alternative embodiment of a polarization independent two-stage reflective optical isolator that includes a corner cube opposite an input/output end for reflecting an input signal backward to an output port for a second stage of isolation; and, FIG. 7 is a plan view of an embodiment of an optical isolator similar to that of FIG. 1, however including multiple input and output ports at an input/output end of the device.

Turning now to FIG. 6, an alternative embodiment of the invention is shown wherein two graded index (GRIN) lenses 61b and 61a are provided at the input/output end of the device for collimating light and focusing light respectively from input optical fiber to the output optical fiber at the input/output end of the device 60. In this embodiment the reflector 22 shown in previous embodiments, has been replaced with a corner cube prism which redirects (via reflection) light launched into the input optical fiber labeled "in" to the output optical fiber labeled "out".

Figure 7:
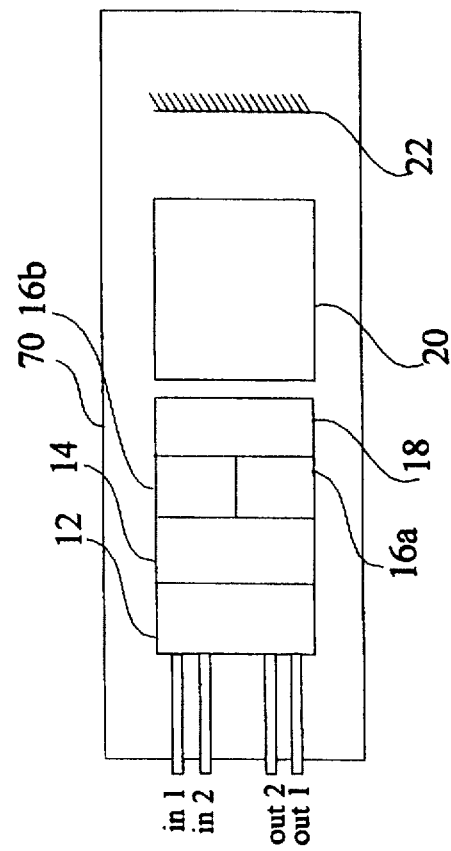

The schematic block diagram of FIG. 7 illustrates the use of multiple input and output optical fibers, thereby providing an isolator with a plurality of input and output ports wherein several signals can be launched and received simultaneously.

Furthermore, numerous other embodiments may be envisaged, without departing from the spirit and scope of the invention.

What I claim is:

1. A multi-stage optical isolating device comprising an input/output end; at least a partial reflector at another end of the device, an isolating means disposed between the input/output end and the other end; a lens means disposed between the input/output end and the other end for directing light to the at least a partial reflector and for directing light from the at least a partial reflector back to the input/output end, the isolating means including a first and second means for providing polarized light from a beam of light, said first and second means having a non-reciprocal rotating means disposed therebetween and directly next to one of the first and second means, said isolating means being absent any lens means wherein the first and second means for providing polarized light each comprise a birefringent crystal, and wherein the non-reciprocal rotating means is a Faraday rotator.

2. A multi-stage optical isolating device as defined in claim 1, wherein the input/output end includes at least an input port and an output port.

3. A multi-stage device as defined in claim 1, wherein the at least partial reflector comprises a corner cube prism.

4. A multi-stage polarization independent optical isolating device comprising:

an input/output end; at least a partial reflector at another end of the device, an isolating means disposed between the input/output end and the other end; a lens means disposed between the input/output end and the other end for directing light to the at least a partial reflector and for directing light from the at least a partial reflector back to the input/output end; the isolating means including a first and second means for providing polarized light from a beam of light, said first and second means having a non-reciprocal rotating means disposed therebetween and directly next to one of the first and second means, said isolating means being absent any lens means, wherein the first and second means for providing polarized light comprise first and second birefringent crystals for separating and combining light.

5. A multi-stage polarization independent optical isolating device as defined in claim 4, including a third birefringent crystal adjacent the second birefringent crystal.

6. A multi-stage polarization independent optical isolating device as defined in claim 5, wherein of the second and third birefringent crystals are of a thickness that is $\sqrt{2}$ times the thickness of the first birefringent crystal.

7. A multi-stage polarization independent optical isolating device as defined in claim 4, further comprising:

second isolating means disposed between the input/output end and the other end;

the second isolating means including third and fourth birefringent crystals for separating and combining light; and a non-reciprocal rotating means disposed between the second and third birefringent crystals, the second isolating means for providing a second stage of isolation and being adjacent to the first isolating means for providing a first stage of isolation.

8. A multi-stage polarization independent optical isolating device as defined in claim 4, wherein the at least partial reflecting surface is substantially reflective.

9. A multi-stage device as defined in claim 4, wherein the lens means is disposed between the isolating means and the other end.

* * * * *